Patented June 16, 1942

2,286,262

UNITED STATES PATENT OFFICE 2,286,262

COLORING WITH VAT DYES AND COMPOSITION THEREFOR

Earl W. Clark, Buffalo, N. Y., assignor to Allied Chemical & Dye Corporation, a corporation of New York No Drawing. Application November 4, 1938, Serial No. 238,811

7 Claims. (Cl. 8—70)

The present invention relates to the art of coloring with vat dyes. It relates more particularly to the art of coloring textile materials containing natural or artificial cellulosic fibers with vat dyes wherein a vat dye is applied to the material in the unreduced form, reduced to the leuco form in the presence of the material, and is then oxidized. The invention especially relates to improved vat dye printing compositions, particularly such compositions as are in a form for direct application to textile materials containing natural or artificial cellulosic fibers such as cotton and rayon.

In the coloring of textile materials with vat dyes by the printing process, vat dye printing pastes are employed which contain a vat dye in the unreduced or in the leuco form. In the usual case the vat dye is in the unreduced form although, where a difficultly reduced vat dye is used, at least partial reduction of the dye is effected prior to the application of the vat dye printing paste to the material. Vat dye printing pastes are usually prepared by dispersing the vat dye in a thickening paste containing a gum such as British gum, an alkali such as potassium carbonate, and a reducing agent such as sodium formaldehyde sulfoxylate. Since the quality of vat dye printing pastes is dependent in an important degree upon the thoroughness with which the vat dye is dispersed in the paste, vat dyes which are intended for use in printing and in the closely-related padding process are provided to the printer in the form of vat dyestuff pastes. These latter pastes usually contain a finely-divided vat dye, water, and a dispersing agent and/or a protective colloid. In order to simplify the making up of the completed vat dye printing pastes, vat dyestuff pastes also usually contain printing assistants of various types which may or may not also perform a useful function in the dyestuff pastes themselves. In using these vat dyestuff pastes in making up a completed vat dye printing paste it is only necessary for the printer to mix the dyestuff paste with the thickening paste containing an alkali and a reducing agent.

The printing of a textile fabric with a vat dye printing paste generally comprises applying the paste to the fabric by means of an engraved roll, exposing the printed fabric to the action of steam ("ageing") in order to reduce the vat dye to the leuco form which possesses strong affinity for the fabric, treating the aged fabric with a mild oxidizing agent to develop the color, and washing and soaping to remove the gum, unfixed color, etc. This process frequently suffers from numerous defects such as poor penetration of the color into the fabric, lack of strength, brilliancy, and levelness of the prints, etc. These defects may be the result of improper ageing time or they may be caused by the presence of an improper amount of alkali and reducing agent in the printing paste, poor dispersion of the vat dye in the printing paste, etc., or combinations of these factors.

A principal object of the present invention is to provide valuable vat dye compositions, especially those containing vat dyes of the antraquinone class, such as the indanthrones, chlorinated indanthrones, dibenzanthrones, and related dyes, for use in printing cellulosic materials, which compositions are either completed vat dye printing pastes or are adapted to be converted to vat dye printing pastes by addition of the usual thickening ingredients, the vat dye printing pastes being stable and possessing good working qualities and producing prints of excellent levelness, brilliance, strength, and penetration.

A further object of the invention is to provide a process of printing cellulosic materials with vat dyes which is characterized by producing prints of improved levelness, brilliance, strength, and penetration.

Other objects of the invention will in part be obvious and will in part appear hereinafter.

The present invention is based upon the discovery that certain organic diamines, which are defined more fully hereinafter, are excellent printing assistants which, when incorporated in relatively small amounts with the other usual ingredients making up vat dye printing pastes, act to improve the stability and working qualities of the resulting printing pastes and also to improve the levelness, brilliance, strength, and penetration of the prints obtained. These assistants may be incorporated in the vat dye printing pastes in any order at the time such printing pastes are prepared. Preferably, however, they are mixed with a finely-divided vat dye (e. g., a press cake such as is obtained in the course of manufacture of dye), water, a dispersing agent and/or other suitable additions to form a vat dyestuff paste which is used for the preparation of a completed vat dye printing paste by mixing it with a thickening paste such as described above.

The organic diamines which are employed as printing assistants in accordance with the present invention are diamines in which the amino groups are unsubstituted and the radical to which the amino groups are attached is an aliphatic, straight or branched, hydrocarbon chain which may be interrupted by a non-carbon linkage. These diamines may be conveniently represented by the following general formula: H₂N—R—NH₂ wherein R is a straight or branched aliphatic hydrocarbon radical which may consist of a single chain or may be interrupted by a non-carbon linkage. Examples of non-carbon linkages which may interrupt the radical represented by R are O, S, and NH. As compounds of this general formula which are adapted for use in the vat dye printing compositions of the invention may be mentioned: ethylenediamine, diethylenetriamine, triethylenetetramine, dipropylenetriamine, tetraethylenepentamine, methylenediamine, 1,3-diaminopropane, 1,6-diaminohexane, 1,2-diamino-2-methylpropane, beta-beta'-diamino-octane, and N(3'-aminopropyl)-1,4-diamino-ether, 2-methyl-1,6-diaminoheptane, 1,8-diamino-octane, and N(3'-aminopropyl)-1,4-diaminobutane.

Of the above organic diamines those which have been found to be particularly valuable for use in the compositions and processes of the invention for economic and technical reasons are the ethylene polyamines containing two —NH₂ groups and not more than three ethylene groups; namely, ethylenediamine, diethylenetriamine, and triethylenetetramine.

As previously indicated, the vat dye printing pastes may be prepared by incorporating the desired amount of one or more of the above assistants with the vat dye in any suitable manner. Thus, for example, the printer may add an assistant or assistants to the thickening paste (containing an alkaline material and a reducing agent) and thoroughly mix the resultant product with the vat dye in powder form, or in whatever form it is furnished him by the dye manufacturer, to form a homogeneous paste; or the dye manufacturer may incorporate the novel assistant directly into the vat dye press cake as it is obtained in the course of manufacture. In the latter case, the dye composition provided by the dye manufacturer consists of a composition for use in printing, since the printer needs only to add the thickening paste in order to prepare a completed vat dye printing paste.

It is preferred, however, to first prepare a vat dyestuff paste containing one or more of the assistants, since such dyestuff pastes are particularly adapted for use in the preparation of completed vat dye printing pastes. Vat dyestuff pastes are obtained, for example, by grinding the press cake of a vat dye, as it is produced in the course of manufacture, in water in the presence of protective colloids and/or dispersing agents and/or other suitable additions. Dextrine is a protective colloid which is frequently used in such pastes and among the dispersing agents which are of interest in this connection are: Tamol NNO (a dispersing agent which is said to be the alkali metal salt of a condensation product of formaldehyde and naphthalene sulfonic acid), other aldehyde condensation products with aromatic sulfonic acids, alkylated and aralkylated aromatic sulfonates, etc. The assistants of the present invention may be readily mixed with vat dyestuff pastes prepared in this way and the resulting pastes comprise valuable compositions for use in the production of vat dye printing pastes.

The vat dye printing pastes preferably also contain a proportion of glycerine or a glycol such as ethylene glycol, diethylene glycol, triethylene glycol, or mixtures of these compounds. Compounds of this class appear to cooperate with the organic diamines in the production of valuable vat dye printing pastes which exhaust well and produce brilliant prints. The glycerine or the glycol, similarly to the organic diamines, is preferably incorporated in the vat dyestuff paste used in the making up of a vat dye printing paste. The vat dyestuff pastes and printing pastes of this invention may also contain printing catalysts or "boosters," reduction accelerators, other hydrotropic and/or enolizing substances, thickening agents, and other assistants, for example, beta-naphthalene sulfonate, which are commonly employed in the art and which are described in greater detail in United States Patent 2,067,927.

As a feature of the invention it has been found to be important to control the amount of assistant present in the printing compositions. In practice it has been found that the use of from 6 parts to 140 parts by weight of assistant for each 100 parts by weight of vat dye solids gives excellent results, although greater or lesser amounts of assistant than these may be present with good results. However, the presence of more than 450 parts by weight of assistant for each 100 parts by weight of vat dye appears to be undesirable since the prints obtained with a paste containing these proportions of dye and assistant upon cotton and rayon fabrics, for unknown reasons, are poorer than those which are obtained without the use of an assistant in the printing paste. The above proportions of assistant if based upon 100 parts by weight of a completed vat dye printing paste are about 0.15 part to about 3 parts, and about 10 parts, respectively.

The following examples in which the parts are by weight will serve to illustrate the invention:

*Example 1.*—A thickener (A) is prepared by heating a mixture of 200 parts of British gum, 490 parts of water, 50 parts of glycerine, and 160 parts of potassium carbonate until the potassium carbonate is completely dissolved and a smooth paste is formed, cooling the resulting paste to a temperature of about 150° F., and stirring in slowly 100 parts of sodium formaldehyde sulfoxylate.

75 parts of thickener (A) as prepared above, 15 parts of Carbanthrene Blue GCD (Color Index No. 1113) as the double paste (containing approximately 15 per cent dye solids) 1.5 parts of ethylenediamine (containing 60 per cent of ethylenediamine, the rest being principally water), 1.5 parts of diethylene glycol, and 7 parts of water are thoroughly mixed to form a paste of uniform composition.

The printing paste which is thus obtained is printed, for example, by means of an engraved roll, upon cotton fabric. The printed fabric is dried and aged thereafter by exposing it for about five minutes to the action of air-free saturated steam at a temperature of about 218°–220° F. in a rapid ager of the Mather-Platt type. After the ageing treatment, the fabric is rinsed well with cold water, soaped in an aqueous solution containing one-quarter per cent soap at a temperature of about 200° F. for about three minutes until the color is fully developed, rinsed with cold water, and dried. A level bright-blue print is obtained which possesses greater strength and brightness and a slightly redder shade than that which is obtained in like manner with a similar printing paste but which contains 2.5 parts of diethylene glycol and no ethylenediamine.

*Example 2.*—75 parts of thickener (A) as prepared in Example 1 above, 15 parts of Vat Orange R (Color Index No. 1217) in the form of a paste containing about 14.5 per cent of dye solids, and about one to two per cent of Tamol NNO, 7 parts of water, and 3 parts of ethylenediamine (containing 60 per cent of ethylenediamine, the rest being principally water) are thoroughly mixed to form a homogeneous printing paste. The resultant printing paste is printed upon cotton and rayon fabrics and the printed fabrics are dried and aged in the manner described in Example 1. After the ageing treatment, the fabrics are immersed in an aqueous solution containing 0.6 per cent of sodium bichromate and 0.2 per cent of acetic acid at a temperature of about 110° F. for about one minute and thereafter soaped, rinsed, and dried as described in Example 1 above. A very bright and level orange print is obtained on both cotton and rayon fabrics.

The remainder of the printing paste employed above is allowed to stand for 48 hours and printed upon cotton and rayon fabrics. The printed fabric is treated in the same manner as described above to develop the color. In both cases a bright and level orange print is obtained on both cotton and rayon fabrics which is distinctly brighter and yellower than the print which is obtained by means of a similar printing paste but which contains no ethylenediamine.

Similar results may be obtained in the above example by employing 3 parts by weight of diethylenetriamine or triethylenetetramine in place of ethylenediamine.

*Example 3.*—A thickener (B) is prepared from 170 parts of British gum, 400 parts of water, 50 parts of glycerine, 190 parts of potassium carbonate, and 190 parts of sodium formaldehyde sulfoxylate in the same manner as described in Example 1 above.

A homogeneous printing paste is prepared by thoroughly mixing 80 parts of thickener B as prepared above, 3.6 parts of diethylene glycol, 0.4 part of triethylenetetramine, and 16 parts of Carbanthrene Dark Blue DR Paste (Color Index No. 1099) containing about 26.9 per cent dye solids, 1 per cent Tamol NNO, 0.1 per cent caustic soda, and 72.0 per cent water.

The paste thus obtained is printed upon cotton and rayon fabrics and the printed fabric is thereafter subjected to the same treatment as described in Example 1 above. The remainder of the printing paste is allowed to stand at room temperature for several hours and applied to cotton and rayon fabrics as described above. Level navy blue prints are obtained on both cotton and rayon which show good penetration into the fiber.

The printing paste as prepared above is appreciably thinner and possesses superior working qualities than a similar printing paste which contains 4 parts of diethylene glycol but no triethylenetetramine.

*Example 4.*—3 parts of triethylenetetramine are thoroughly mixed with about 97 parts of Carbanthrene Blue G Paste containing approximately 16.5 per cent of dye solids, 70 to 80 per cent diethylene glycol, and about one per cent of Tamol NNO. (Carbanthrene Blue G is a chlorinated indanthrone containing approximately 3.4 per cent of chlorine.)

5 parts of the product obtained above and 20 parts of thickener (A) (prepared as described in Example 1 above) are thoroughly mixed to form a smooth, homogeneous paste.

The resultant paste is printed upon cotton and rayon fabrics and the printed fabrics are treated in the same manner as described in Example 1 above. Level blue prints are obtained on both cotton and rayon fabrics which are appreciably brighter than those which are obtained with a similar printing paste but which contains no triethylenetetramine.

Similarly, brighter prints result from the use of triethylenetetramine if the diethylene glycol used above is replaced by suitable amounts of glycerine, triethylene glycol, or mixtures of these.

It will be understood, of course, that the above examples are merely illustrative of the invention and that the details of the procedures described therein may be varied widely within the scope of the invention. Thus, in place of the organic diamines used in the examples there may be used any one or a mixture of organic diamines included within the scope of the above formula. For example, there may be used any of the diamines specifically referred to above.

In the above examples, the assistants are added in the form of the free amines. This is generally advisable since the assistants should be present in the vat dye printing paste in the free amine form. In certain cases, however, the assistant may be added in the form of the amine salt; e. g., the hydrochloric or sulfuric acid salt. This is possible providing the vat dye compositions are capable of converting the amine salt to the free amine. For example, when an amine salt is added to an aqueous alkaline vat dye composition, the amine salt is ordinarily converted to the free amine.

While the vat dye compositions of the present invention are primarily designed to be employed as printing pastes or in the preparation of such pastes, the invention also includes vat dye compositions containing assistants of the above class, which compositions are adapted for use as padding baths or in the preparation of such baths. A composition of the present invention designed for use as a padding bath would differ principally from a vat dye printing paste in that the reducing agent would be eliminated from the composition and the proportion of thickener present would be reduced.

It should be understood that the term "vat dye" is employed herein to include those dyes which are applicable to textile fabrics by a process in which the dyes are reduced by the aid of an alkali and a hydrosulfite compound. Thus the term includes dyes of the anthraquinone, indigoid, and thioindigoid series, and complex dyes which contain sulfur in their molecules and are applicable to textile materials by a hydrosulfite reduction procedure. As examples of dyes which may be used in the compositions of the present invention the following may be mentioned:

| | Color Index No. |
|---|---|
| Carbanthrene Yellow G | 1118 |
| Carbanthrene Golden Orange RRT | 1027 |
| Carbanthrene Golden Orange G | 1096 |
| Carbanthrene Blue Green FFB | 1173 |
| Carbanthrene Violet 2R | 1104 |
| Carbanthrene Dark Blue DR | 1099 |
| Carbanthrene Flavine GC | 1095 |
| Vat Red Violet RH | 1212 |
| Vat Orange R | 1217 |
| Brilliant Indigo 4BR | 1184 |

Since changes may be made in the above compositions and processes without departing from the scope of the invention it is intended that the above description shall be interpreted as illustrative and not in a limiting sense.

I claim:

1. A vat dye composition for use in coloring cellulosic textile material by a process in which a paste containing a vat dye is applied to the material, comprising a vat dye and for each 100 parts by weight of said vat dye not more than 450 parts by weight of an organic polyamine of the following general formula $H_2N-R-NH_2$, wherein R represents a radical selected from the group consisting of aliphatic hydrocarbon radicals and aliphatic hydrocarbon radicals interrupted by an NH group.

2. A vat dye composition in paste form for use in printing cellulosic textile materials, comprising a vat dye and for each 100 parts by weight of said vat dye not more than 450 parts by weight of a printing assistant which is an ethylene polyamine containing two $NH_2$ groups and not more than three ethylene groups.

3. A vat dye composition in paste form for use in printing cellulosic textile materials, comprising a chlorinated indanthrone vat dye and for each 100 parts by weight of said vat dye not more than 450 parts by weight of a printing assistant which is an ethylene polyamine containing two $NH_2$ groups and not more than three ethylene groups.

4. A vat dye composition in paste form for use in printing cellulosic textile materials, comprising a vat dye of the anthraquinone class, at least one member of the group consisting of glycerine, ethylene glycol, diethylene glycol, and triethylene glycol, and, as a printing assistant, for each 100 parts by weight of said vat dye 6 to 140 parts by weight of an organic polyamine of the following general formula $H_2N-R-NH_2$, wherein R represents a radical selected from the group consisting of aliphatic hydrocarbon radicals and aliphatic hydrocarbon radicals interrupted by an NH group.

5. A vat dye composition in paste form for use in printing cellulosic textile materials, comprising a chlorinated indanthrone vat dye, at least one member of the group consisting of glycerine, ethylene glycol, diethylene glycol, and triethylene glycol, and, as a printing assistant, for each 100 parts by weight of said vat dye 6 to 140 parts by weight of an ethylene polyamine containing two $NH_2$ groups and not more than three ethylene groups.

6. A vat dye composition for use in printing cellulosic textile materials, comprising an unreduced vat dye of the anthraquinone class, diethylene glycol, and, as a printing assistant, triethylenetetramine in an amount not exceeding 140 parts by weight per 100 parts by weight of said vat dye.

7. A process of printing cellulosic textile material with vat dyes which comprises applying to said material a vat dye printing paste comprising a chlorinated indanthrone vat dye, a thickener, at least one member selected from the group consisting of glycerine, ethylene glycol, diethylene glycol, and triethylene glycol, and as a printing assistant, triethylene tetramine in amount equal to 0.15 to 3 per cent by weight of said vat dye printing paste.

EARL W. CLARK.

CERTIFICATE OF CORRECTION.

Patent No. 2,286,262. June 16, 1942.

EARL W. CLARK.

It is hereby certified that error appears in the printed specification of the above numbered patent requiring correction as follows: Page 2, first column, lines 18, 19 and 20, for "beta-beta'-diamino-octane, and N(3'-aminopropyl)-1,4-diamino-ether," read --beta-beta'-diamino-diethyldisulfide, beta-beta'-diaminodiethylether,--; and that the said Letters Patent should be read with this correction therein that the same may conform to the record of the case in the Patent Office.

Signed and sealed this 11th day of August, A. D. 1942.

(Seal)

Henry Van Arsdale,
Acting Commissioner of Patents.